United States Patent
Teraoka (10) Patent No.: US 6,796,412 B2
(45) Date of Patent: Sep. 28, 2004

(54) DIFFERENTIAL APPARATUS

(75) Inventor: Masao Teraoka, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/305,887

(22) Filed: Nov. 27, 2002

(65) Prior Publication Data

US 2003/0121750 A1 Jul. 3, 2003

(30) Foreign Application Priority Data

Dec. 27, 2001 (JP) .......................................... 2001-397602
Feb. 8, 2002 (JP) .......................................... 2002-033043

(51) Int. Cl.[7] .............................................. F16D 13/04
(52) U.S. Cl. ...................... 192/35; 192/54.5; 192/66.2; 192/93 A; 475/84; 475/150; 475/231
(58) Field of Search .............................. 192/54.5, 93 R, 192/93 A, 66.2, 70.2, 35; 475/84, 231, 150

(56) References Cited

U.S. PATENT DOCUMENTS

| | | | | |
|---|---|---|---|---|
| 3,606,803 A | * | 9/1971 | Otteman | 475/232 |
| 3,831,462 A | * | 8/1974 | Baremor | 475/87 |
| 4,389,909 A | * | 6/1983 | Goscenski, Jr. | 475/232 |
| 4,838,118 A | * | 6/1989 | Binkley | 475/86 |
| 5,366,421 A | * | 11/1994 | Hirota | 475/231 |
| 5,911,643 A | * | 6/1999 | Godlew et al. | 475/150 |
| 6,537,172 B1 | * | 3/2003 | McAuliffe et al. | 475/150 |
| 6,623,394 B2 | * | 9/2003 | Seeley | 475/150 |

FOREIGN PATENT DOCUMENTS

JP 50-20331 7/1975

* cited by examiner

Primary Examiner—Saul Rodriguez
(74) Attorney, Agent, or Firm—Morrison & Foerster LLP (57) ABSTRACT

Differential apparatus which includes input and output members rotatable relative to each other, a clutch mechanism for interconnecting them, an actuator and a cam mechanism. The clutch mechanism includes first and second clutch members rotating with the input and output members, respectively. The actuator limits rotation of the second clutch member relative to the input member to angularly displace the second clutch member relative to the output member. The cam mechanism is provided between the second clutch member and the output member, and includes first and second cam faces rotating with the second clutch member and the output member, respectively. When the actuator operates, these cam faces cooperate to axially displace the second clutch member away from the output member, whereby the second clutch member is axially displaced to engage with the first clutch member.

24 Claims, 4 Drawing Sheets

FIG.4

DIFFERENTIAL APPARATUS

BACKGROUND OF THE INVENTION

1. Field of the Invention

The present invention relates to a differential apparatus provided with a differential limiting function or a differential locking function.

2. Description of the Related Art

The Japanese Patent Application Laid-open No. 50(1975)-20331 discloses a differential apparatus with a differential limiting function including a cone clutch, a cam mechanism, an actuator, a stop mechanism and the like.

In the differential apparatus, the differential operation is mechanically limited by the actuator, the stop mechanism and the like. Therefore, a wheel needs to spin at high speed to lock the differential operation, whereby the differential operation cannot be controlled while the vehicle is moving. Specifically, the differential operation cannot be locked or the lock cannot be released in dependence on conditions of vehicle speed, steering, a road surface, or the like.

The actuator and the stop mechanism are composed of a number of parts, such as balances and weights, coil springs of three types, or the like, which are difficult to adjust weight or spring constants thereof, causing unstable motion and variation of products.

Generally, a fluid pressure actuator, such as a pneumatic actuator and a hydraulic actuator or an actuator using an electromagnet, is employed to control the differential operation in dependence on conditions of vehicle speed, steering, and the road surface. Particularly, the fluid pressure actuator is employed because it is capable of generating a large differential limiting force required to lock the differential operation.

However, the fluid pressure actuator needs a pressure source (pump) and a pressure line (piping). Modification or alteration of a casing or a vehicle body for accommodating the differential apparatus is required to make space for arrangement of the pressure source and line. Moreover, it is difficult to unitize, package or modularize the differential apparatus, the pressure source, the pressure line, and the like.

The fluid pressure actuator has low reliability because of possible leak from each portion of the pressure source and line, which causes loss of function. For preventing the leak, seals need to be enforced, thus leading to cost increase.

Meanwhile, in the case of the actuator using an electromagnet, it is difficult to obtain enough differential limiting force to lock the differential operation.

SUMMARY OF THE INVENTION

The object of the present invention is to provide a differential apparatus using an electromagnet, in which enough differential limiting force can be obtained to lock differential operation.

Another object of the present invention is to provide a unitized differential apparatus having a differential limiting function, making modification and alteration of a casing or a vehicle body minor or unnecessary.

An aspect of the present invention is a differential apparatus comprising: a rotary input member; a rotary output member within the input member, rotatable relative to the input member; a clutch mechanism for interconnecting the input member and the output member, the clutch mechanism including a first clutch member rotatable together with the input member and a second clutch member rotatable together with the output member, the second clutch member to be axially displaced to engage with the first clutch member; an actuator for limiting rotation of the second clutch member relative to the input member to angularly displace the second clutch member relative to the output member; and a cam mechanism provided between the second clutch member and the output member for engaging the first and second clutch members, the cam mechanism including a first cam face to be rotated together with the second clutch member and a second cam face to be rotated together with the output member, wherein the first and second cam faces cooperate to axially displace the second clutch member away from the output member, as the second clutch member is angularly displaced relative to the output member by the actuator, whereby the second clutch member is axially displaced to engage with the first clutch member.

BRIEF DESCRIPTION OF THE DRAWINGS

The invention will now be described with reference to the accompanying drawings wherein:

FIG. 1b is an explanatory view of a cam mechanism of the differential apparatus in FIG. 1a.

DETAILED DESCRIPTION OF THE PREFERRED EMBODIMENTS

Embodiments of the present invention will be explained below with reference to the drawings, wherein like members are designated by like reference characters, and members without reference characters are not illustrated in the drawings. Left/right in the following description corresponds to left/right in FIGS. 1a to 3, respectively.

First Embodiment

Figure 1A:
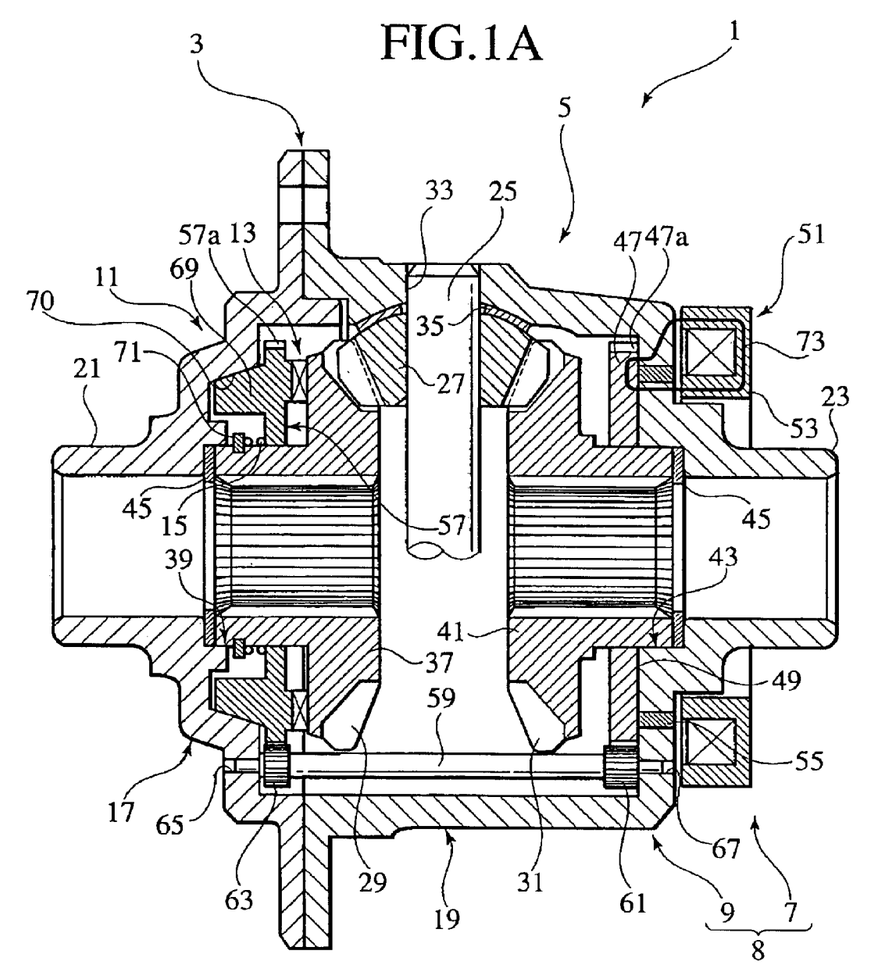
FIG. 1a is a sectional view of a differential apparatus according to a first embodiment of the present invention.

As shown in FIG. 1a, a differential apparatus 1 (a first embodiment of the present invention) is composed of a differential case 3 (input member), a bevel gear type differential mechanism 5 (output member), an actuator 8 including a frictional force generation mechanism 7 and a transmission mechanism 9, a cone clutch 11 (clutch mechanism), a cam 13 (cam mechanism), a return spring 15, a controller, and the like.

The differential case 3 includes a casing body 19 in the right side of FIG. 1a and a cover 17 fixed on a left opening of the casing body 19 with bolts. The differential case 3 is arranged within a differential carrier.

A boss portion 21 of the cover 17 and a boss portion 23 of the casing body 19 are individually supported on the differential carrier with bearings. An oil reservoir is formed within the differential carrier.

On the differential case 3, a ring bevel gear is fixed with bolts to be engaged with an output bevel gear of a propeller shaft of a power train. The propeller shaft is connected to a transmission. A driving force from an engine is transmitted to the differential case 3 via the transmission and the propeller shaft to rotate the differential case 3.

The differential mechanism 5 within the differential case 3, which is rotatable relative to the differential case 3, is composed of pinion shafts 25, pinion gears 27, left and right side gears 29 and 31, and the like.

Each pinion shaft 25 is engaged with a through hole 33 at both ends thereof provided in the casing 19, and fixed to the casing 19 with a spring pin. Each pinion gear 27 is rotatably supported on the pinion shaft 25. The left side gear 29 and the right side gear 31 are engaged with the pinion gear 27 on the left and right thereof, respectively.

Between the casing body 19 and each pinion gear 27, a spherical washer 35 is interposed. The spherical washer 35 receives a centrifugal force of the pinion gear 27 when the differential case 3 is rotating and a reaction force which is applied to the pinion gear 27 by engagement of the left and the right side gears 29 and 31.

A hub portion 37 of the left side gear 29 is rotatably supported by a bearing portion 39 of the cover 17 and connected to a left wheel through an axle spline-connected to the hub portion 37. A hub portion 41 of the right side gear 31 is rotatably supported by a bearing portion 43 of the casing body 19 and connected to a right wheel through an axle spline-connected to the hub portion 41.

Between the hub portion 37 of the left side gear 29 and the boss portion 21 of the cover 17, and between the hub portion 41 of the right side gear 31 and the boss portion 23 of the casing body 19, thrust washers 45 are individually arranged. The thrust washers 45 receive reaction forces applied to the left and right side gears 29 and 31 by engagement of the pinion gears 27 and the left and the right side gears 29 and 31, respectively.

The driving force from the engine is distributed to the left and the right side gears 29 and 31 from the differential case 3 via the pinion shafts 25 and the pinion gears 27, and transmitted to the left and the right wheels via the axles thereof.

For example, when a difference of drive resistance occurs between the left and the right wheels while a vehicle is moving on a rough road, each pinion gear 27 rotates about an axis of the pinion shaft 25, and thus the driving force from the engine is distributed to the left and right sides.

The actuator 8 is composed of the frictional force generation mechanism 7, the transmission mechanism 9, and the like.

The frictional force generation mechanism 7 is composed of a right ring gear 47 (armature) made of a magnetic material, a friction clutch 49 (pilot clutch) formed between the right side surface of the right ring gear 47 and the inner surface of the right side wall of the casing body 19, an electromagnet 51, and the like.

The right ring gear 47 Is supported on the outer circumferential surface of the hub portion 41 of the right side gear 31 so as to be displaceable in an axial direction and rotatable relative to the hub portion 41, and is centered.

A core 53 of the electromagnet 51 is connected to the differential carrier through a support member, and fixed thereto so as not to rotate. Moreover, the core 53 is supported on the outer circumferential surface of the boss portion 23 with a bearing interposed therebetween and is centered. The inner diameter of the core 53 is smaller than the outer diameter of the right ring gear 47, and projections of the core 53 and the right ring gear 47 in the axial direction are overlapped each other. A moderate air gap is provided between a left side face of the core 53 and the outer surface of the right side wall of the casing body 19 in the vicinity thereof. A lead wire of the electromagnet 51 is drawn out of the differential carrier through a grommet and connected to a battery on the vehicle.

The core 53, the right side wall of the casing body 19, and the right ring gear 47 constitutes a magnetic path of the electromagnet 51. The right side wall of the casing body 19 is radially divided into an inner wall and an outer wall by a ring 55 made of stainless steel of a non-magnetic material. The ring 55 is embedded in the casing body 19 at a radial position corresponding to the electromagnet 51. The ring 55 prevents a short circuit of magnetic flux on the magnetic path.

The transmission mechanism 9 is composed of a gear portion 47a (first gear portion) formed in the right ring gear 47, a gear portion 57a (second gear portion) formed in a left ring gear (clutch member) 57, left and right pinion gears 61 and 63, small-diameter shafts (shaft member) 59 connecting the left and right pinion gears 61 and 63, and the like.

The left ring gear 57 is supported on the outer circumferential surface of the hub portion 37 of the left side gear 29 so as to be movable in the axial direction and angularly displaceable, and is centered. The left ring gear 57 can rotate together with the left side gear 29 and rotates relative to the cover 17. The left ring gear 57 is the same as the right ring gear 47 in diameter.

The shafts 59 are arranged along the axial direction between the pinion gears 27 outside the left and right side gears 29 and 31 in the radial direction within the casing body 19. Both ends of each shaft 59 are rotatably supported by left and right bearing portions 65 and 67, which are formed in the cover 17 and the right side wall of the casing body 19, respectively.

The right pinion gear (first pinion gear) 61 is formed on the right end side of the shaft 59 and engaged with the right ring gear 47. The left pinion gear (second pinion gear) 63 is formed on the left end side of the shaft 59 and engaged with the left ring gear 57.

The left and right pinion gears 61 and 63 and the left and right ring gears 47 and 57 are spur gears in order that an engagement reaction force is not generated in the axial direction when the pinion gears 61 and 63 and the ring gears 47 and 57 rotate in engagement with each other.

Therefore, the rotation of the left ring gear 57 is transmitted to the right ring gear 47 at equal speed via the left pinion gear 63, the shafts 55, and the right pinion gear 61.

The cone clutch 11 is operated to interconnect the cover 17 and the left ring gear 57. The cone clutch 11 includes a cone portion 69 integrally formed on a left sidewall of the left ring gear 57 and a conical friction surface portion 70 increasing in diameter toward the right. The friction surface portion 70 is provided on the inner surface of the sidewall of the cover 17 and rotates with the cover 17.

Figure 1B:
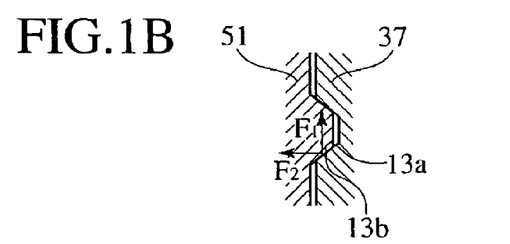

The cam 13 is provided between a right side surface of the left ring gear 57 and a left side surface of the left side gear 29. As shown in FIG. 1b, the cam 13 includes a cam face 13a rotating together with the hub portion 37 of the left side gear 29 and a cam face 13b rotating together with the left ring gear 57 and engaging with the cam face 13a. These cam faces 13a and 13b are inclined in the circumferential direction at a certain distance from the rotation axis. If differential torque is applied between the left side gear 29 and the left ring gear 57 by the actuator 8, a circumferential direction force F1 acts on the cam faces 13a and 13b, and then slip restrained by the engaging faces thereof is produced to generate a thrust force F2 in the axial direction, which is called a cam thrust force. The left side gear 29 and the left ring gear 57 are displaced in the axial direction so as to separate from each other by this thrust force F2.

The cone clutch 11 and the cam 13 are arranged on the left side of the differential mechanism 5 in the axial direction, and the friction clutch 49 and the electromagnet 51 are arranged on the right side of the differential mechanism 5 in the axial direction, which are substantially symmetrically arranged.

The return spring 15 is arranged between the left ring gear 57 and a snap ring 71 attached on the outer circumferential surface of the hub portion 37 of the left side gear 29. The return spring 15 presses the left ring gear 57 rightward, that is, in a direction of releasing coupling of the cone clutch 11, or in a direction of engaging the cam 13.

The controller detects the vehicle moving in a curve from detection signals of a vehicle speed, a steering angle, a lateral gravity, and the like. The controller excites the electromagnet 51, controls an exciting current, stops excitation, and so on in dependence on road conditions.

When the electromagnet 51 is excited, a magnetic flux loop 73 is formed in the above described magnetic path, and the right ring gear 47 is attracted rightward to be pressed against the casing body 19. Accordingly, the friction clutch 49 is engaged to generate a frictional force. The frictional force brakes rotation of the right ring gear 47 relative to the casing body 19. Furthermore, the braking force is transmitted to the left ring gear 57 via the right ring gear 47, the right pinion gear 61, the shafts 59, and the left pinion gear 63 of the transmission mechanism 9 to brake rotation of the left ring gear 57 relative to the cover 17.

If differential rotation is generated within the differential mechanism 5 in this state, relative angular displacement is generated between the left ring gear 57 and the left side gear 29, and thus differential torque is applied to the cam 13 provided therebetween. The differential torque causes the cam 13 to generate the cam thrust force to displace the left ring gear 57 and the cone portion 69 thereof leftward in the axial direction against the return spring 15. Accordingly, the cone portion 69 is engaged with the friction surface portion 70 to engage the cone clutch 11 and a differential limiting force is generated.

As described above, the cam 13 is actuated using the differential torque of the left side gear 29 to amplify the engaging force of the cone clutch 11, so that a large differential limiting force can be obtained. Furthermore, a wedge effect (self-lock function) by an angle of the conical friction surface of the cone clutch 11 amplifies the differential limiting force. Therefore, the electromagnet 51 can be employed, obtaining the differential limiting force enough to lock the differential operation.

When the differential limiting force thus obtained is larger than differential lock torque of the differential mechanism 5, the differential operation is locked. When the differential limiting force is smaller than the differential lock torque, the cam thrust force of the cam 13 is increased or decreased in dependence on variation in the differential torque, so that a differential limiting function similar to that of a torque sensitive type can be obtained.

Furthermore, if slip of the friction clutch 49 is adjusted by controlling the exciting current of the electromagnet 51, the braking force by the frictional force, differential torque, and the cam thrust force of the cam 13 vary, and the differential limiting force can be freely controlled.

When the excitation of the electromagnet 51 is stopped, the friction clutch 49 is disengaged, and the cam thrust force of the cam 13 disappears. Then, the left ring gear 57 is returned rightward by the pressing force of the return spring 15, and the cone clutch 11 is disengaged. Accordingly, the differential rotation of the differential mechanism 5 becomes free.

Note that, even if the friction clutch 49 is activated by the excitation/non-excitation and the current control of the electromagnet 51 as described above, a moderate air gap is always maintained between the outer surface of the right sidewall of the casing body 19 and the electromagnet 51. The air gap prevents the rotation of the casing body 19 from being interfered by contacting the electromagnet 51 and receiving sliding resistance.

When the friction clutch 49 and the cone clutch 11 are disengaged as described above, the left ring gear 57, the shafts 59, the left and right pinion gears 61 and 63, and the right ring gear 47 rotate in conjunction with the rotation of the left side gear 29 to generate relative rotation (sliding rotation) between the right ring gear 47 and the right side gear 31.

The thrust washer 45 on the left end of the left side gear 29 receives a reaction force which is applied to the left side gear 29 by engagement of the pinion gears 27 and the left side gear 29 and resists the leftward movement of the left side gear 29 relative to the casing body 19. The return spring 15 presses the left ring gear 57 rightward relative to the left side gear 29. Therefore, a moderate gap is secured within the cone clutch 11, thus preventing the cone clutch 11 from being inadvertently engaged and generating the differential limiting force.

The controller excites the electromagnet 51, controls the exciting current, and stops the excitation at arbitrary timing to perform differential lock, adjustment of the differential limiting force, release of the lock, and the like in dependence on conditions of a vehicle speed, steering, a road surface, or the like. Such operations improve a starting ability, an acceleration ability, a turning ability, a steerability, stability, an off-road ability of the vehicle and the like.

The differential case 3 is provided with an opening, and on the inner circumferential surfaces of the boss portions 21 and 23, spiral oil grooves are formed.

The lower half of the differential apparatus 1 is immersed in oil of the oil reservoir. In accordance with the rotation of the differential case 3 and the ring gears thereof, the oil flows into/out of the differential case 3 through the opening and the spiral oil grooves, and sufficiently lubricates and cools the engaging portions of the gears 27, 29, and 31 (the differential mechanism 5), the sliding portions between the outer circumferential surfaces of the pinion shafts 25 and the pinion gears 27, the thrust washers 45 and 45, the spherical washer 35, the support portions 39 and 43 of the left and right side gears 29 and 31, the friction clutch 49, the engaging portions of the gears 47, 61, 63, and 57 of the transmission mechanism 9, the sliding portions between the ring gears 47 and 57 and the hub portions 41 and 37 of the side gears 29 and 31, the cam 13, the cone clutch 11, and so on.

Moreover, the electromagnet 51 is cooled by the oil which is splashed over by the rotation of the differential case 3 and the ring gears as well as the lower half thereof is immersed in the oil reservoir. Accordingly, the capability (magnetic force) thereof is stabilized, so that the function of the friction clutch 49 and the differential limiting force of the cone clutch 11 are stabilized.

In the differential apparatus 1 structured as described above, the pressure source, the pressure line and the space for arrangement thereof become unnecessary unlike the differential apparatus using the fluid pressure actuator. Accordingly, the differential apparatus becomes simple in structure and compact, thus enhancing mountability on the vehicle. Moreover, installation of the pressure line becomes unnecessary, so that assembly of the device is facilitated and the assembly costs are reduced.

Moreover, function is not lost by pressure leak, so that high reliability can be obtained. It becomes unnecessary to enforce the seals of the pressure line for preventing leak, which saves the costs.

The differential apparatus 1 and the electromagnet 51 can be easily unitized, packaged, or modularized. Accordingly, the impact to the differential carrier and the vehicle body is minimized and the modification and the alteration thereof become minor or unnecessary.

The frictional force generation mechanism 7 (friction clutch 49) for generating frictional force between the differential case 3 and the right ring gear 47 is a pilot clutch for activating the cam 13. As described above, the cone clutch 11 for the differential limiting force is engaged by the cam 13. Accordingly, the electromagnet 51 only needs a magnetic force in amount enough to engage the friction clutch 49, and the electromagnet 51 is not required to have a particularly large amount of magnetic force (excitation power).

Therefore, the electromagnet 51 becomes small and lightweight, and accordingly the differential apparatus 1 is made to be small and lightweight. Furthermore, burdens on the in-vehicle battery and an alternator for charge of the battery are reduced, thus reducing fuel consumption of the engine which drives the alternator.

The cone clutch 11 and the cam 13 are arranged on the left side of the differential mechanism 5 and the friction clutch 49 and the electromagnet 51 are arranged on the right side of the differential mechanism 5. Accordingly, the deferential device 1 is balanced in weight with respect to the differential center, and factors of generating vibration can be restrained. Moreover, the burden on the bearing supporting the differential apparatus 1 on the differential carrier is reduced, thus enhancing durability.

With respect to the dimensional center of the differential mechanism 5, the differential mechanism 5 is balanced in the axial direction, so that the axles connected to the side gears 29 and 31 can be designed to have equal dimensions. Therefore, it is possible to share the axles and reduce the costs. Moreover, since the modification and the alteration of the differential carrier or the vehicle body for compensating imbalance in the lengths of the left and right axles and the weight are avoided, the costs are further reduced.

Since the cone clutch 11 can generate a large differential limiting force with a comparatively small area of the friction surface, the differential apparatus 1 is structured to be compact.

Since the cone clutch 11 has a friction surface of a small area, drag torque owing to oil viscosity is small. Therefore, the differential limit and lock are easily released, thus maintaining good steerability without the remaining differential limit torque and keeping the engine fuel-efficient.

Moreover, if the gear ratio of the right pinion gear 61, the right ring gear 47, the left pinion gear 63, and the left ring gear 57 is changed, for example, the diameter of the right pinion gear 61 is designed to be larger than that of the left pinion gear 63 and the diameter of the right ring gear 47 is designed to be smaller than that of the left ring gear 57, the braking force of the friction clutch 49 is amplified to be transmitted to the left ring gear 57. Accordingly, the capacity of the electromagnet 51 can be reduced.

Furthermore, if the right pinion gear 61 and the ring gear 47, or the left pinion gear 63 and the left ring gear 57 are helical gears, the positions thereof in the axial direction can be controlled by utilizing the engagement reaction force generated in rotation of the right pinion gear 61 and the ring gear 47, or the left pinion gear 63 and the left ring gear 57 in engagement with each other.

Second Embodiment

Figure 2:
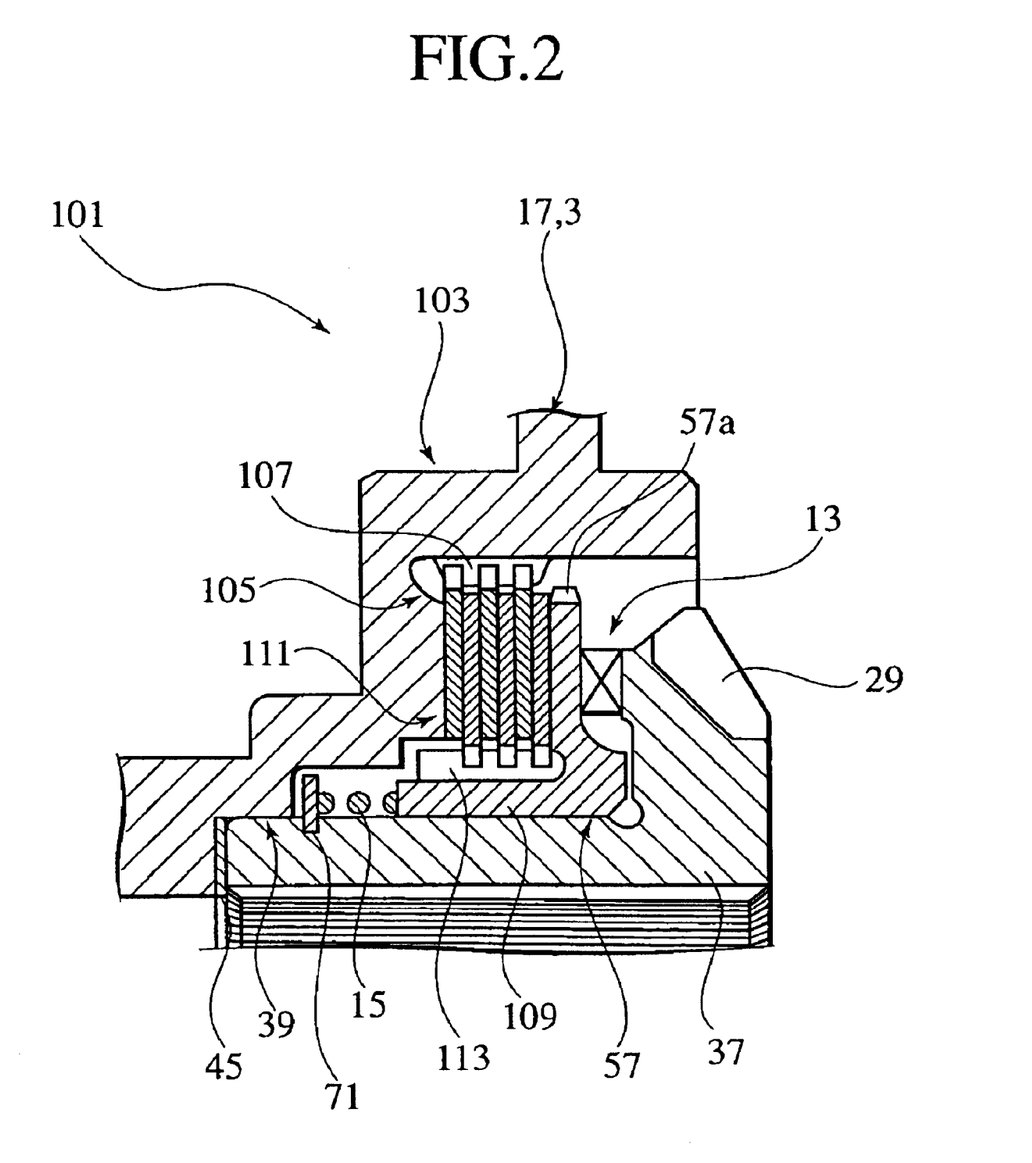
FIG. 2 is an enlarged sectional view showing a clutch mechanism of a differential apparatus according to a second embodiment of the present invention.

As shown in FIG. 2, a differential apparatus 101 (a second embodiment of the present invention) is composed of a differential case 3, a bevel gear type differential mechanism 5, an actuator 8 including a frictional force generation mechanism 7 and a transmission mechanism 9, a multiple plate clutch 103 (clutch mechanism), a cam 13, a return spring 15, a controller, and the like.

The differential apparatus 101 has a structure in which the cone clutch 11 in the differential apparatus 1 of the first embodiment is substituted with the multiple plate clutch 103.

Next, description will be made on differences from the differential apparatus 1 of the first embodiment.

The multiple plate clutch 103 is provided between the inner surface of the sidewall of the cover 17 and the left side surface of the left ring gear 57. In the radially inside portion of the left ring gear 57, a hub portion 109 is formed extending leftward in the axial direction along the outer circumferential surface of the hub portion 37 of the left side gear 29. Outer plates 105 are connected to a spline portion 107 so as to be slidable in the axial direction, the spline portion 107 being formed on the inner circumferential surface of the cover 17. Inner plates 111 are connected to a spline portion 113 so as to be slidable in the axial direction, the spline portion 113 being formed on the outer circumferential surface of the hub portion 109 of the left ring gear 57.

When the electromagnet 51 is excited, the right ring gear 47 is attracted rightward to engage the friction clutch 49. The frictional force thereof brakes rotation of the left ring gear 57 via the transmission mechanism 9. If differential rotation is generated in the differential mechanism 5 in such a state, the cam 13 is activated by differential torque between the left ring gear 57 and the left side gear 29 to engage the multiple plate clutch 103.

When the differential limiting force thus obtained is larger than the differential lock torque of the differential mechanism 5, the differential operation is locked. When the differential limiting force is smaller than the differential lock torque, a differential limiting force similar to that of a torque sensitive type can be obtained by the cam thrust force of the cam 13.

When the slip of the friction clutch 49 is adjusted by controlling the exciting current of the electromagnet 51, the differential limiting force can be freely controlled.

When the excitation of the electromagnet 51 is stopped, the multiple plate clutch 103 is disengaged by the pressing force of the return spring 15, and the differential rotation of the differential mechanism 5 becomes free.

The multiple plate clutch 103 generates differential limiting force enough to lock the differential operation because of the wide area of the friction surfaces between a number of plates 105 and 111.

Moreover, in the multiple plate clutch 103, the differential limiting force can be easily adjusted by changing the number of plates 105 and 111. Therefore, the differential apparatus 101 can be applied to the wide range of different vehicle types.

Third Embodiment

Figure 3:
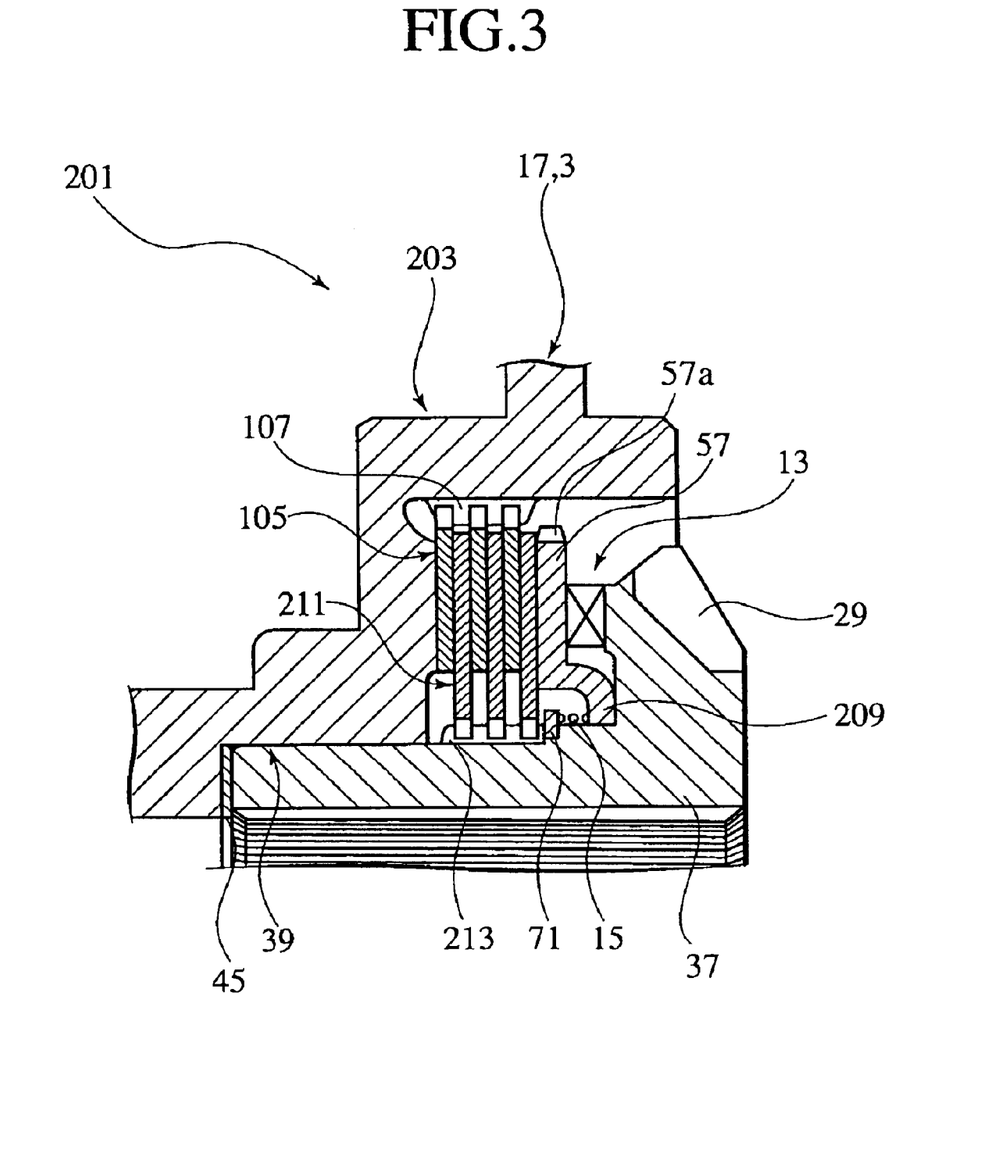
FIG. 3 is an enlarged sectional view showing a clutch mechanism of a differential apparatus according to a third embodiment of the present invention.

As shown in FIG. 3, a differential apparatus 201 (a third embodiment of the present invention) is composed of a differential case 3, a bevel gear type differential mechanism 5, an actuator 8 including a frictional force generation mechanism 7 and a transmission mechanism 9, a multiple plate clutch 203 (clutch mechanism), a cam 13, a return spring 15, a controller, and the like.

Next, description will be made on differences from the differential apparatus 1 of the first embodiment.

The multiple plate clutch 203 includes inner plates 211 and the outer plates 105, which are provided between the inner surface of the sidewall of the cover 17 and the left side surface of the left ring gear 57, and the left ring gear 57 as a pressing member for pressing the inner and outer plates 211 and 105 for displacement in the axial direction to engage the inner and outer plates 211 and 105. In the radially inside portion of the left ring gear 57, a hub portion 209 is formed. The hub portion 209 extends rightward in the axial direction along the outer circumferential surface of the hub portion 37 of the left side gear 29. The outer plates 105 are connected to the spline portion 107, which is formed on the inner circumferential surface of the cover 17, so as to be slidable in the axial direction. The inner plates 211 are connected to a spline portion 213, which is formed on the outer circumferential surface of the hub portion 37 of the left side gear 29, so as to be slidable in the axial direction.

The snap ring 71 is attached to the outer circumferential surface of the hub portion 37 of the left side gear 29 on the right side of the multiple plate clutch 203 and stops the return spring 15.

When the multiple plate clutch 203 is engaged by excitation of the electromagnet 51, the differential limiting force thereof is transmitted directly to the left side gear 29 via the inner plate 211 of the multiple plate clutch 203, without passing through the cam 13. Accordingly, the capacity of the cam 13 can be reduced.

Fourth Embodiment

Figure 4:
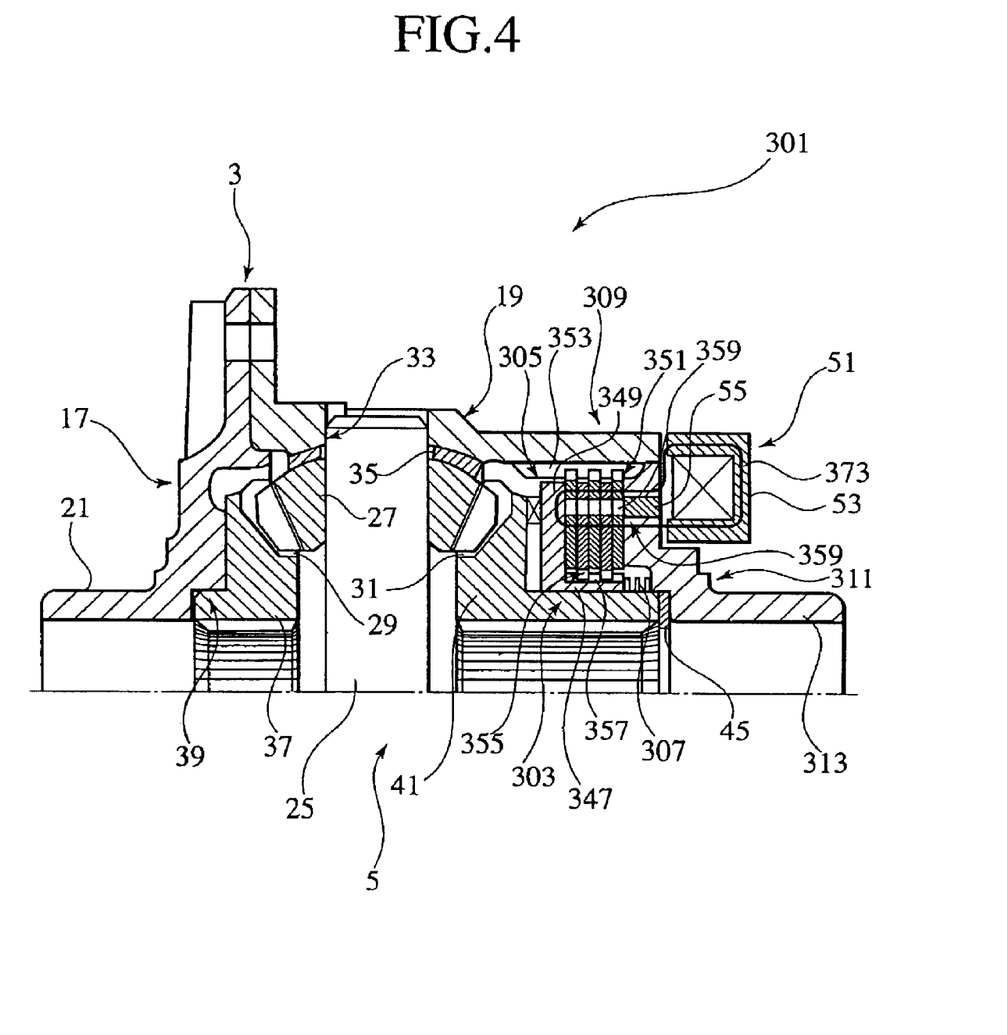
FIG. 4 is a sectional view of a differential apparatus according to a fourth embodiment of the present invention.

As shown in FIG. 4, a differential apparatus 301 (a fourth embodiment of the present invention) is composed of a differential case 3, a bevel gear type differential mechanism 5, an armature 303, a cam 305 (cam mechanism), a multiple plate pilot clutch 309 (clutch mechanism), a return spring 307, an electromagnet 51 (actuator), a controller, and the like.

Next, description will be made on differences from the differential apparatus 1 of the first embodiment.

The differential case 3 includes the cover 17, the casing body 19 of a non-magnetic material, and a rotor 311 of a magnetic material. The cover 17 is fixed on the left opening of the casing body 19 with bolts. The rotor 311 is welded on a right opening of the casing body 19 to constitute the right side wall of the differential case 3.

The differential case 3 is arranged within the differential carrier. The boss portion 23 of the cover 17 and a boss portion 313 of the rotor 311 are supported by the differential carrier with bearings interposed therebetween. The oil reservoir is formed within the differential carrier.

The hub portion 37 of the left side gear 29 is supported by the support portion 39 of the cover 17 and connected to the left wheel via the axle spline-connected to the hub portion 37. The hub portion 41 of the right side gear 31 is connected to the right wheel via the axle spline-connected to the hub portion 41.

Between the hub portion 41 of the right side gear 31 and the boss portion 313 of the rotor 311, a thrust washer 45 is arranged. The thrust washer 45 receives a reaction force which is applied to the right side gear 31 by engagement of the right side gear 31 and the pinion gears 27.

The armature 303 is composed of a disk-shaped flange portion 349 and a hub portion 347 integrally formed so as to extend rightward in the axial direction from the radially inside portion of the flange portion 349 along the outer circumferential surface of the hub portion 41 of the right side gear 31. The armature 303 is supported on the outer circumferential surface of the hub portion 41 of the right side gear 31.

The cam 305 is provided between the left surface of the flange portion 349 of the armature 303 and the right side surface of the right side gear 31. The return spring 307 is provided on the outer circumferential surface of the hub portion 41 of the right side gear 31 between a left end surface of the boss portion 313 of the rotor 311 and a right end portion of a hub portion 347 of the armature 303. The return spring 307 presses the armature 303 leftward with respect to the differential case 3, that is, in the direction of engaging the cam 305.

The pilot clutch 309 is provided between the left side surface of the rotor 311 and the flange portion 349 of the armature 303 inside the casing body 19. Outer plates 351 thereof are connected to a spline portion 353 so as to be slidable in the axial direction, the spline portion 353 being formed on the inner circumferential surface of the casing body 19. Inner plates 355 thereof are connected to a spline portion 357 so as to be slidable in the axial direction, the spline portion 357 being formed on the outer circumferential surface of the hub portion 347 of the armature 303.

The core 53 of the electromagnet 51 is supported on the rotor 311 with a bearing interposed therebetween and is centered. The inner diameter of the core 53 is smaller than the outer diameter of the flange portion 349 of the armature 303, and the projections of the core 53 and the armature 303 in the axial direction are overlapped each other. A moderate air gap is provided between the left side surface of the core 53 and the right side surface of the rotor 311 in the vicinity thereof.

The core 53, the rotor 311, the pilot clutch 309, and the armature 303 constitute a magnetic path of the electromagnet 51.

The rotor 311 is radially divided into an inner wall and an outer wall by the ring 55 of stainless steel as a non-magnetic material. The ring 55 is embedded in the rotor 311 at the radial position corresponding to the electromagnet 51. Each of plates 351 and 355 of the pilot clutch 309 is circumferentially provided with notches 359 at a plurality of positions and bridge portions between the notches 359 in a radial position corresponding to the ring 55. The bridges connect the radially inside and the outside of each of the plates 351 and 355. The ring 55 and the notches 359 prevent a short circuit of magnetic flux on the magnetic path.

When the electromagnet 51 is excited, a magnetic flux loop 373 is formed on the above described magnetic path, and the armature 303 is attracted and displaced rightward in the axial direction. The armature 303 presses and engages the pilot clutch 309 between the armature 303 and the rotor 311 to generate pilot torque (frictional force). Therefore, the relative rotation of the armature 303 with respect to the differential case 3 is limited.

When differential rotation is generated in the differential mechanism 5 in the state where the pilot torque is generated, relative angular displacement is generated between the armature 303, which is connected to the differential case 3 via the pilot clutch 309, and the right side gear 31, and the differential torque is applied to the cam 305 provided therebetween. With the differential torque, the cam 305 generates the cam thrust force and moves the armature 303 rightward against the return spring 307. The engaging force of the pilot clutch 309 is thus amplified.

The above described self-lock function of the pilot clutch 309 by the cam 305 allows a large differential limiting force to be obtained. When the differential limiting force thus obtained exceeds the differential lock torque of the differential mechanism 5, the differential operation is locked. As described above, the actuator using the electromagnet 51 can generate enough differential limiting force to lock the differential operation.

When the differential limiting force is smaller than the differential lock torque, the differential limiting force of the torque sensitive type can be obtained by the cam thrust force of the cam 305, which varies in dependence on variation in the differential torque.

Furthermore, if slip of the pilot clutch 309 is adjusted by controlling the exciting current of the electromagnet 51, the pilot torque of the pilot clutch 309 and the cam thrust force of the cam 305 vary, and the differential limiting force can be freely controlled.

When the excitation of the electromagnet 51 is stopped, the armature 303 is returned leftward by the pressing force of the return spring 307, and the pilot clutch 309 is disengaged. Accordingly, the pilot torque and the cam thrust force of the cam 305 disappear, and the differential rotation of the differential mechanism 5 becomes free.

In the embodiment, as described above, the pilot clutch 309 serves as a main clutch for locking the differential operation with the engaging force amplified by the cam 305. In other words, the clutch mechanism serves as the pilot clutch and the clutch for limiting the differential operation.

Moreover, the thrust washer 45 on the right end of the hub portion 41 of the right side gear 31 receives a reaction force which is applied to the right side gear 31 by engagement of the right side gear 31 and the pinion gears 27, and resists the rightward movement of the right side gear 31 relative to the rotor 311. The return spring 307 presses the armature 303 leftward relative to the rotor 311. Therefore, a moderate gap is secured between the armature 303 and the pilot clutch 309, thus preventing the pilot clutch 309 from being inadvertently engaged and generating the differential limiting force.

The differential case 3 is provided with an opening, and spiral oil grooves are formed on the inner circumferential surfaces of the boss portions 21 and 313.

The lower half of the differential apparatus 301 is immersed in the oil of the oil reservoir. In accordance with the rotation of the differential case 3, the oil flows into/out of the differential case 3 through the opening and the spiral oil grooves, and sufficiently lubricates and cools the engaging portions of the gears 27, 29, and 31, the sliding portions between the outer circumferential surfaces of the pinion shafts 25 and the pinion gears 27, the thrust washer 45, the spherical washer 35, the support portion 39 of the left side gear 29, the sliding portion between the hub portion 347 of the armature 303 and the hub portion 41 of the right side gear 31, the cam 305, the pilot clutch 309, the both ends of the return spring 307, and so on.

Moreover, the electromagnet 51 is cooled by the oil which is splashed over by the rotation of the differential case 3 and the ring gears thereof, thus stabilizing the capability (magnetic force) thereof. Accordingly, the operating function of the pilot clutch 309 is stabilized.

The invention may be practiced or embodied in still other ways without departing from the spirit or essential character thereof. For instance, the engine in the present invention can be an electric motor converting electric energy into torque.

The clutch mechanism for use in the differential apparatus may be a clutch mechanism of another type. For example, the clutch mechanism used in the differential apparatus of the fourth embodiment may be a cone clutch. As shown in the third embodiment, the multiple plate clutch having the inner plate attached to the side gear may be used.

The differential mechanism is not limited to the bevel gear differential mechanism, but may be a planetary gear type differential mechanism, a differential mechanism including a pair of output side gears connected to a pinion gear, which is accommodated in a housing hollow of the differential case so as to be freely slidable and rotatable, a differential mechanism using a worm gear, and so on.

Moreover, the cam mechanism may be a ball cam, which is composed of a curved surface rotating together with the side gear, a curved surface rotating together with the ring gear or the armature, and a ball interposed therebetween. The ball cam displaces the curved surfaces so as to separate from each other in the direction of the rotation axis when relative angular displacement between the surfaces is generated.

The differential apparatus can be used as any one of a front differential (differential apparatus for distributing the driving force from the motor into the left and the right front wheels), a rear differential (differential apparatus for distributing the driving force from the engine into the left and the right rear wheels), and a center differential (differential apparatus for distributing the driving force from the engine into the front wheels and the rear wheels).

The preferred embodiments described herein are therefore illustrative and not restrictive, the scope of the invention being indicated by the claims and all variations which come within the meaning of claims are intended to be embraced therein.

The present disclosure relates to subject matters contained in Japanese Patent Application No. 2001-397602, filed on Dec. 27, 2001, and Japanese Patent Application No. 2002-33043, filed on Feb. 8, 2002, the disclosure of which are expressly incorporated herein by reference in its entirety.

What is claimed is:

1. A mechanism for interconnecting a rotary input member and a rotary output member within the input member, rotatable relative to the input member, the mechanism comprising:

first and second engaging members provided within the input member and engageable with each other, the first engaging member rotatable together with the input member, the second engaging member rotatable together with the output member, and axially and angularly displaceable relative to the output member;

an electromagnet provided outside the input member, for having the first and second engaging members provide the second engaging member with a first tendency to be angularly displaced relative to the output member, as the output member rotates relative to the input member; and a cam mechanism provided between the second engaging member and the output member, for providing the second engaging member with a second tendency to be axially displaced relative to the output member, as the first tendency is provided by the electromagnet.

2. The mechanism for interconnecting a rotary input member and a rotary output member according to claim 1, wherein:
the second engaging member is axially displaced and pressed against the first engaging member by the electromagnet to generate a frictional force as the first tendency.

3. The mechanism for interconnecting a rotary input member and a rotary output member according to claim 1, wherein:
a rotor is provided on the input member in the vicinity of the electromagnet, and the second engaging member is axially displaced relative to the rotor.

4. The mechanism for interconnecting a rotary input member and a rotary output member according to claim 1, further comprising:
a biasing member for biasing the second engaging member in a direction of disengaging from the first engaging member.

5. The mechanism for interconnecting a rotary input member and a rotary output member according to claim 1, wherein:
the cam mechanism includes a first cam face to be rotated together with the second engaging member and a second cam face to be rotated together with the output member, wherein the first and second cam faces cooperate to axially displace the second engaging member away from the output member, as the second engaging member is provided with the first tendency.

6. The mechanism for interconnecting a rotary input member and a rotary output member according to claim 1, wherein:
the first and second engaging members have a self-lock function.

7. The mechanism for interconnecting a rotary input member and a rotary output member according to claim 1, wherein:
the first and second engaging members collectively constitute a friction clutch.

8. The mechanism for interconnecting a rotary input member and a rotary output member according to claim 1, wherein:
the first and second engaging members collectively constitute a multiple plate clutch.

9. The mechanism for interconnecting a rotary input member and a rotary output member according to claim 8, wherein:
the first engaging member has an outer plate connected to a spline portion formed on the input member, and the second engaging member has an inner plate for engagement with the outer plate, connected to a spline portion formed on a part of the second engaging member.

10. A differential apparatus provided with a mechanism for interconnecting a rotary input member and a rotary output member thereof according to claim 1.

11. A mechanism for interconnecting a rotary input member and a rotary output member within the input member, rotatable relative to the input member, the mechanism comprising:
a first clutch member rotatable together with the input member;
a second clutch member rotatable together with the output member and engageable with the first clutch member;
an actuator member within the input member, for providing the second clutch member with a first tendency to be angularly displaced relative to the output member, as the output member rotates relative to the input member;
an electromagnet provided outside the input member, for having the actuator member provide the first tendency; and
a cam mechanism provided between the second clutch member and the output member, for providing the second clutch member with a second tendency to engage with the first clutch member, as the first tendency is provided by the actuator member.

12. The mechanism for interconnecting a rotary input member and a rotary output member according to claim 11, wherein:
the actuator member comprises an armature to be pressed against a part of the input member between the armature and the electromagnet.

13. The mechanism, for interconnecting a rotary input member and a rotary output member according to claim 12, wherein:
the armature is rotatable relative to the input and output members, and is axially displaced and pressed against the part of the input member by the electromagnet to generate a frictional force as the first tendency.

14. The mechanism for interconnecting a rotary input member and a rotary output member according to claim 13, wherein:
the actuator member further comprises a transmission mechanism for transmitting the frictional force to the second clutch member, connected to the armature thereof and the second clutch member.

15. The mechanism for interconnecting a rotary input member and a rotary output member according to claim 14, wherein:
the transmission mechanism of the actuator member comprises:
a first gear portion formed on the armature;
a second gear portion formed on the second clutch member;
a first pinion gear engaged with the first gear portion;
a second pinion gear engaged with the second gear portion; and
a shaft member connecting the first and second pinion gears.

16. The mechanism for interconnecting a rotary input member and a rotary output member according to claim 11, further comprising:
a biasing member for biasing the second clutch member in a direction of disengaging from the first clutch member.

17. The mechanism for interconnecting a rotary input member and a rotary output member according to claim 11, wherein:
the cam mechanism includes a first cam face to be rotated together with the second clutch member and a second cam face to be rotated together with the output member, wherein the first and second cam faces cooperate to axially displace the second clutch member away from the output member, as the second clutch member is provided with the first tendency.

18. The mechanism for interconnecting a rotary input member and a rotary output member according to claim 11, wherein:

the first and second clutch members have a self-lock function.

19. The mechanism for interconnecting a rotary input member and a rotary output member according to claim 11, wherein:

the first and second clutch members collectively constitute a friction clutch.

20. The mechanism for interconnecting a rotary input member and a rotary output member according to claim 11, wherein:

the first and second clutch members collectively constitute a cone clutch.

21. The mechanism for interconnecting a rotary input member and a rotary output member according to claim 11, wherein:

the first and second clutch members collectively constitute a multiple plate clutch.

22. The mechanism for interconnecting a rotary input member and a rotary output member according to claim 21, wherein:

the first clutch member has an outer plate connected to a spline portion formed on the input member, and the second member has an inner plate for engagement with the outer plate, connected to a spline portion formed on a part of the second clutch member.

23. The mechanism for interconnecting a rotary input member and a rotary output member according to claim 21, wherein:

the first clutch member has an outer plate connected to the spline portion formed on the input member, and the second clutch member has an inner plate for engagement with the outer plate, connected to a spline portion formed on the output member.

24. A differential apparatus provided with a mechanism for interconnecting a rotary input member and a rotary output member thereof according to claim 11.

* * * * *